US006996936B1

(12) United States Patent  (10) Patent No.: US 6,996,936 B1
Maass  (45) Date of Patent: Feb. 14, 2006

(54) SEALING AND GUIDING STRIP FOR A WINDOW WITH INSERT FOR CORNER OF THE WINDOW FRAME

(75) Inventor: Klaus Peter Maass, Isenbüttel (DE)

(73) Assignee: GDX North America Inc., New York, NY (US)

( * ) Notice: Subject to any disclaimer, the term of this patent is extended or adjusted under 35 U.S.C. 154(b) by 0 days.

(21) Appl. No.: 10/069,650

(22) PCT Filed: Aug. 2, 2000

(86) PCT No.: PCT/GB00/02975

§ 371 (c)(1),
(2), (4) Date: Sep. 11, 2002

(87) PCT Pub. No.: WO01/15926

PCT Pub. Date: Mar. 8, 2001

(30) Foreign Application Priority Data

Aug. 27, 1999 (GB) .................................... 9920394

(51) Int. Cl.
  *E06B 7/16* (2006.01)
(52) U.S. Cl. .................. 49/479.1; 49/482.1; 49/489.1; 49/440
(58) Field of Classification Search ............... 49/475.1, 49/479.1, 482.1, 489.1, 440
See application file for complete search history.

(56) References Cited

U.S. PATENT DOCUMENTS

| 5,010,689 | A | * | 4/1991 | Vaughan | 49/440 |
|---|---|---|---|---|---|
| 5,042,201 | A | * | 8/1991 | Vaughn | 49/482.1 |
| 5,155,938 | A | * | 10/1992 | Nozaki | 49/441 |
| 5,258,157 | A | * | 11/1993 | Nozaki et al. | 264/261 |
| 5,269,101 | A | | 12/1993 | Nozaki et al. | |
| 5,398,451 | A | * | 3/1995 | Mesnel | 49/479.1 |
| 5,463,832 | A | * | 11/1995 | Eckart | 49/479.1 |
| 5,493,814 | A | * | 2/1996 | Christian | 49/479.1 |

(Continued)

FOREIGN PATENT DOCUMENTS

| EP | 0678412 | 10/1995 |
|---|---|---|
| GB | 2259730 | 3/1993 |

(Continued)

*Primary Examiner*—Gregory J. Strimbu
(74) *Attorney, Agent, or Firm*—Leydig, Voit & Mayer, Ltd.

(57) ABSTRACT

A window sealing and guiding channel for a window frame carried by a vehicle door is arranged to match the sharp angle at the corner of the frame. A distal lip of the wall of the channel on the inside of the window is severed from the remainder of the channel side wall from a point on one side of the sharp corner, through the sharp corner to the end of the channel, and this lip is bent into a smooth curve to bridge across the sharp corner. The lip on the other channel side wall is also severed from the remainder of its side wall at the sharp corner. In addition, the lip of the other channel side wall is cut through to form a mitered joint matching the angle at the sharp corner. The remainder of the channel side walls is removed at the sharp corner and replaced by a previously molded insert having a channel-form at the sharp corner and an extended wall portion filling the gap where the lip of the inside channel wall bridges across the corner. A third wall of the channel has a lip which bridges the sharp corner in a smooth curve between the other lips and thereby hiding the molded insert from view.

10 Claims, 3 Drawing Sheets

U.S. PATENT DOCUMENTS

| | | | | |
|---|---|---|---|---|
| 5,545,448 | A | * | 8/1996 | Ford et al. .................... 428/31 |
| 5,718,084 | A | * | 2/1998 | Takamiya ................... 49/440 |
| 5,839,232 | A | * | 11/1998 | Backes et al. ............. 49/479.1 |
| 6,185,869 | B1 | * | 2/2001 | Kawai ........................ 49/441 |
| 6,240,677 | B1 | * | 6/2001 | Baumann .................. 49/479.1 |

FOREIGN PATENT DOCUMENTS

| | | |
|---|---|---|
| GB | 2311799 | 10/1997 |
| GB | 2321268 | 7/1998 |
| JP | 8127249 | 5/1996 |
| JP | 11129836 | 5/1999 |

* cited by examiner

SEALING AND GUIDING STRIP FOR A WINDOW WITH INSERT FOR CORNER OF THE WINDOW FRAME

BACKGROUND OF THE INVENTION (1) Field of the Invention

The invention relates to a window sealing and guiding channel for a window opening having a sharp corner, comprising a channel base and first and second integral channel side walls made of flexible material, each side wall having a lip extending along its distal edge, the lip on the first side wall being separated from that side wall over a region extending along a portion of the channel including the sharp corner, the separated lip smoothly bridging across the sharp corner, the lip on the second side wall being separated from that side wall at the corner and miter-cut there to form a miter joint matching the sharp angle, an insert being secured between the separated lip of the first side wall and the remainder of that side wall over the said region.

The invention also relates to a window sealing and guiding channel for sealing and guiding a window glass having a sharp corner, the channel having a base and integral first and second channel walls each having a distal edge carrying a respective lip, the first wall being cut through to separate its distal edge portion including the lip from the remainder of the wall, the cut extending along the length of the wall from a first position on one side of the sharp corner, and through the sharp corner, the second wall being cut through at the sharp corner to separate a distal edge portion thereof including the respective lip from the remainder of that wall, the distal edge portion of the second wall being itself cut through at the sharp corner to form a mitered joint therein matching the sharp corner, the distal edge portion of the first wall being formed into a smooth curve bridging across the sharp corner, an insert being secured in position between and spacing apart the distal edge portion of the first wall and the said remainder thereof, the insert having a size which from the said first position to the sharp corner progressively increases the spacing between the distal edge portion of the first wall and the remainder thereof and thereafter progressively decreases that spacing to zero at a second position on the opposite side of the sharp corner to the first position.

(2) Description of Related Art

Such channels are shown for example in GB-A-2 311 799. However, the insert, which may be separately manufactured, may present a slightly different appearance as compared with the channel walls.

BRIEF SUMMARY OF THE INVENTION

According to the invention, therefore, the channel as first set forth above is characterised in that the channel further comprises a third wall extending from the channel base adjacent the first side wall and made of flexible material, the third wall having a lip extending along its distal edge which is separated from that side wall at the corner and which follows a smooth curve between the miter joint of the second side wall lip and the curve of the first side wall lip and which thereby substantially overlies the said insert.

Also according to the invention, the channel as secondly set forth above is characterised in that the channel has a third channel wall having a distal edge carrying a respective lip, the third wall being adjacent the first side wall and being cut through to separate its distal edge portion including the lip from the remainder of the wall, the cut extending along the length of the wall from the first position and through the sharp corner, the distal edge portion of the third wall being formed into a smooth curve bridging across the sharp corner between the smooth curve of the distal edge portion of the first wall and the mitered joint of the distal edge portion of the second wall and overlying the insert, the remainder of the first, second and third walls and the base of the channel being removed at the sharp corner and replaced by a molded channel part integrally moulded with the insert.

DETAILED DESCRIPTION OF THE SEVERAL VIEWS OF THE DRAWINGS

Sealing and guiding strips for windows in motor vehicle bodies, and embodying the invention, will now be described, by way of example only, with reference to the accompanying diagrammatic drawings in which.

DETAILED DESCRIPTION OF THE INVENTION

Figure 1:
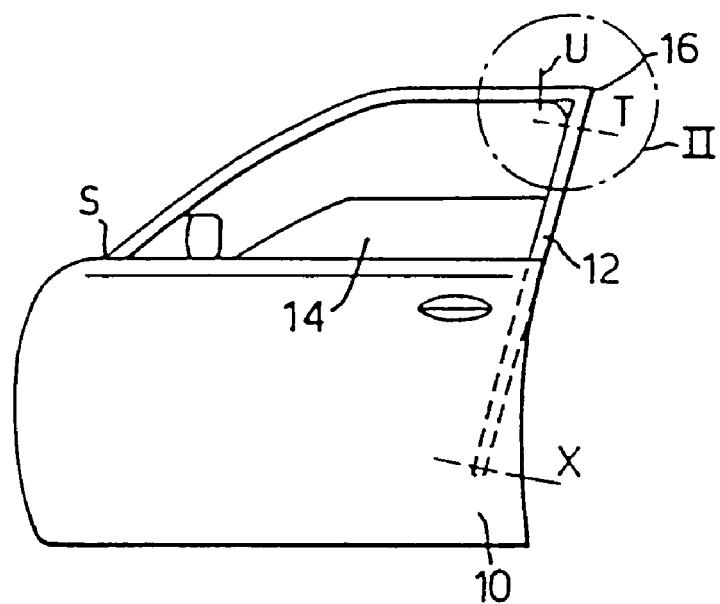
FIG. 1 is a side view of a vehicle door.

FIG. 1 shows a vehicle door 10 carrying a window frame 12. A pane of window glass 14 is slidable in a vertical direction in the window frame 12 and can be raised from and lowered into the lower part of the door 10. The window frame 12 is produced from metal or other stiff material and is formed to produce a sharp corner 16.

In a manner to be explained in more detail below, the window frame 12 is of channel-shape in cross-section and supports a sealing and guiding strip 18 produced from flexible material such as plastics or rubber and in which the window glass 14 slides. The sealing and guiding channel 18 is designed to provide a weather-proof seal for the edge of the window glass and also to impose low friction on the movement of the glass.

Figure 2:
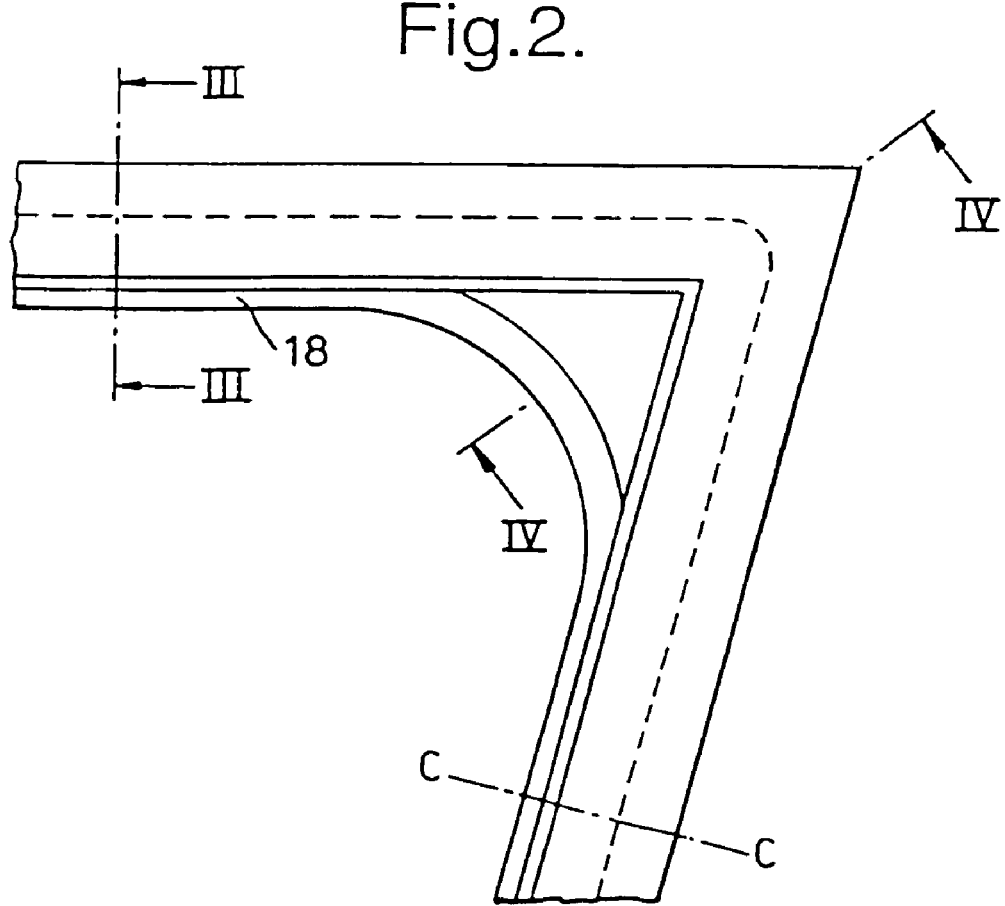
FIG. 2 is an enlarged view of the area II of FIG. 1, showing one of the sealing and guiding strips.
Figure 4:
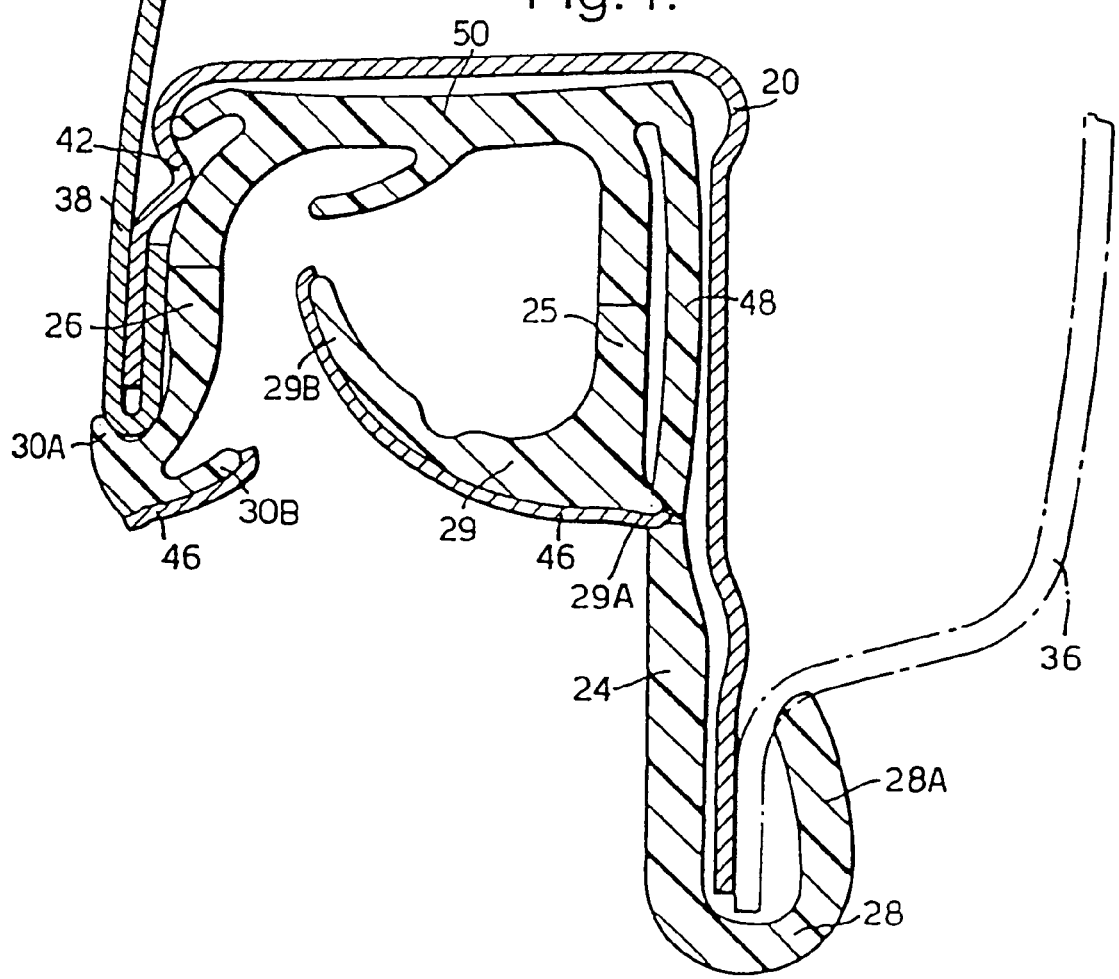
FIG. 4 is a section on the line IV—IV of FIG. 2.
Figure 5:
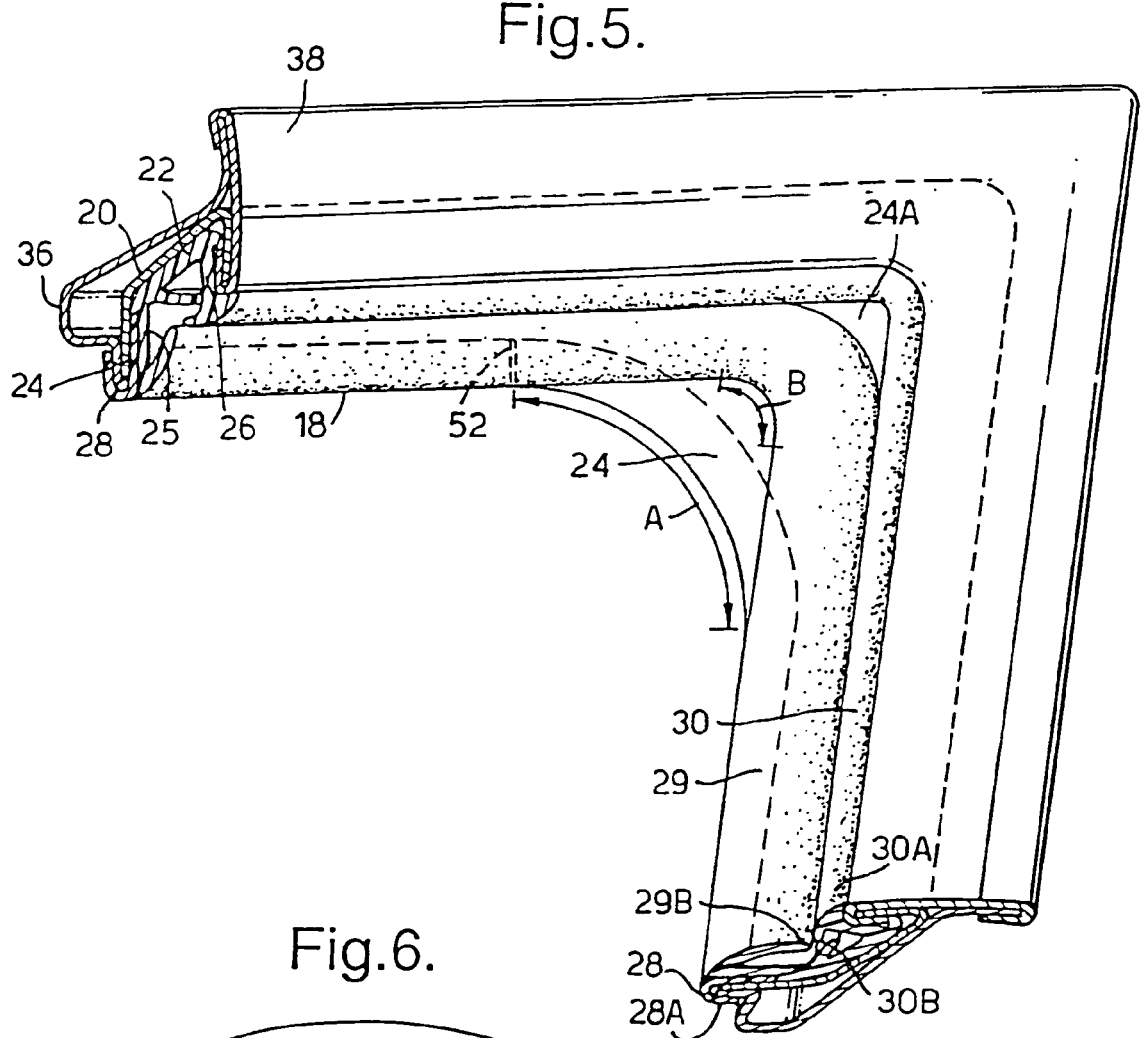
FIG. 5 is a perspective view of the window frame and sealing strip and corresponding to FIG. 2.

FIGS. 2 and 5 show, to an enlarged scale, the window frame 12 and the sealing and guiding channel 18 in the region II of FIG. 1. The window frame 12, which will be described in more detail with reference to FIGS. 3 and 4, defines a stiff mounting channel 20 (FIG. 5) in which is supported the sealing and guiding channel 18. The channel 18 has a base 22 and side walls 24 and 26. Each of these side walls 24,26 terminates in a respective lip 28,30, the lips having portions 28A and 30A which overlap the respective distal edges of the side walls of the mounting channel 20.

A third wall 25 extends from the channel base 22 adjacent the side wall 24. The wall 25 has a lip 29 which has a portion 29A which abuts (but is not connected to) the lip 28 of the wall 24. The lips 29 and 30 also have a portions 29B and 30B which extend partway across the mouth of the sealing and guiding channel 18.

As shown most clearly in FIG. 5, the longitudinal extension of the lip 30 matches the sharp corner 16 of the window frame 12. However, the longitudinal extension of the lip 28 is shaped differently and bridges across the sharp corner 16 in a smooth radius, as indicated over the region A in FIG. 5. At the region A, the side wall 24 has to be extended, of course, as indicated at 24A. The smooth radius region A is positioned on the inside of the window glass 14.

Similarly, the longitudinal extension of the lip 29 bridges across the sharp corner 16 in a smooth radius. This is indicated over region B of FIG. 5. It will be seen that the radius B is shorter than radius A and that the smooth curve of the lip 29 follows a path between the smooth curve of the lip 28 and the sharp corner of the lip 30.

The channel 18 is produced by an extrusion process from plastics or rubber.

Figure 3:
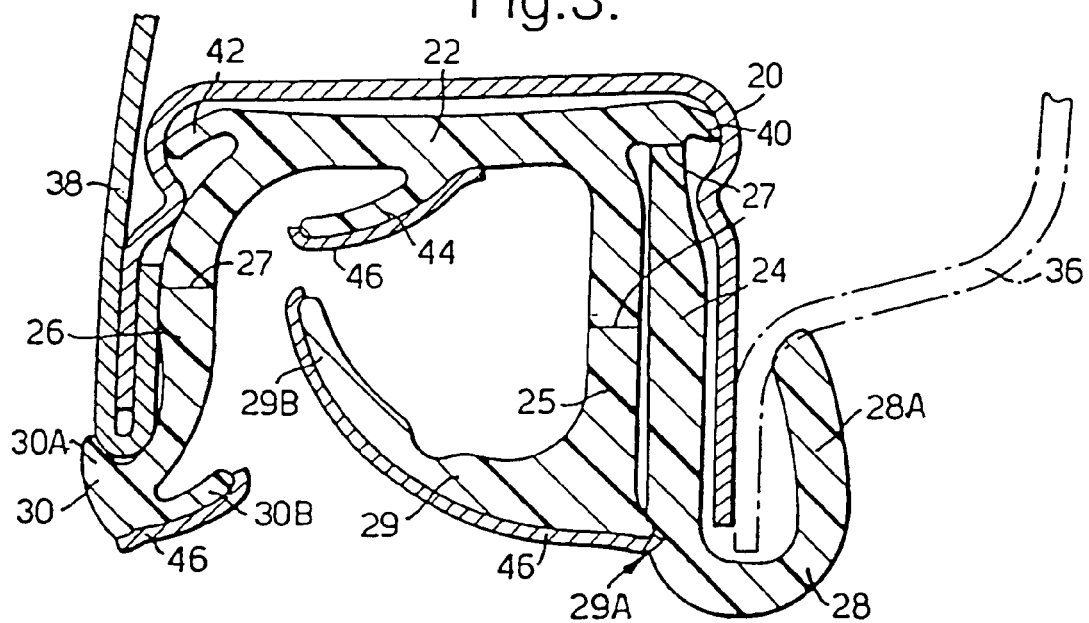
FIG. 3 is a section on the line III—III of FIG. 2.

FIG. 3 shows a cross-section through the extruded channel 18 at the line III—III of FIG. 2. FIG. 3 also shows the window frame 12 in more detail.

As shown in FIG. 3, the window frame 12 comprises channel-shaped metal producing the mounting channel 20, a frame member 36 supporting the channel 20, and an outer trim strip 38. The latter is bent to attach it to one of the walls of the mounting channel 20 and to one of the edges (not shown) of the outer frame member 36. The latter is bent over the opposite distal edge of the mounting channel 20.

The window channel 18 defines shoulders 40 and 42 on the outsides of the side walls 24,26 and positioned near the base 22 of the channel. These shoulders 40,42 engage indentations formed in the mounting channel 20 and thus locate the window channel 18 securely in position.

FIG. 3 also shows that the window channel 18 includes a lip 44 at the base of the channel against which the edge of the window glass abuts when the window is fully closed. The outwardly facing surface of the lip 44 is covered with flock 46 to provide improved sealing and low friction. As the window glass enters the channel, the lip surfaces 29B and 30B are bent inwardly to allow passage of the window glass. The surfaces of the lip portions 29B and 30B which contact the glass are also covered with the flock 46.

The channel 18 is produced to have the cross-section shown in FIG. 3 and a length equal to that from points S and X in FIG. 1. However, after the extrusion process, a cut is made through the side wall 24 of the channel of the position indicated by the line 27 to sever the lip 28 from the remainder of the side wall. This cut starts at the point U in FIG. 1 and continues to the point T on the other side of the corner. It will be appreciated that, although the start and end points of this cut are indicated on FIG. 1, the cut is in fact made before the channel 18 is mounted on the frame. An insert 47 (FIG. 6) is then placed in position as will now be described. This insert produces the required sharp corner in the channel walls 25 and 26 and the lip 30 and the required extended side wall 24A (see FIG. 5) over the region A. The insert may be previously molded and adhesively secured to the channel or may be molded in situ after the extruded channel has been cut.

FIG. 4 shows a section through the channel 18 at a position after the beginning U of the cut. As shown in FIG. 4, the side wall 24 has been cut through and a molded portion 48 of the insert 47 has been inserted. The molded portion 48 provides the desired increase in the length of the side wall 24.

Figure 6:
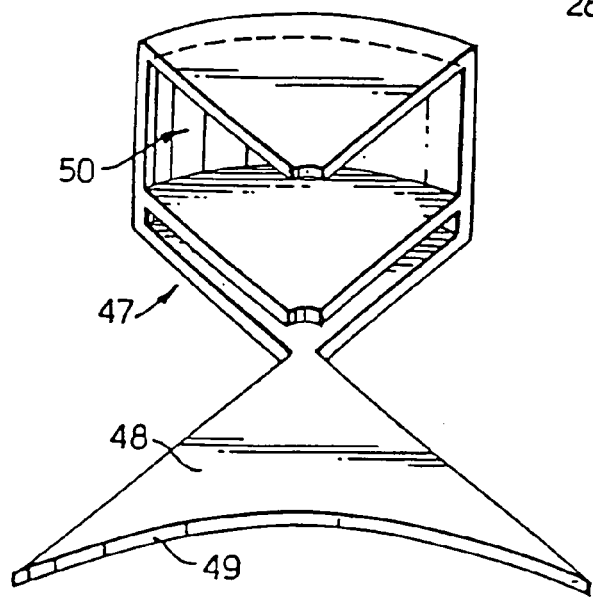
FIG. 6 is a perspective view of a moulded insert used in the strip.

The molded portion 48 smoothly increases in size towards the corner 16, thus progressively increasing the length of the side wall 24 as shown in FIG. 6 and thereby producing the extended side wall portion 24A as shown in FIG. 5.

As shown in FIG. 6, the molded portion 48 merges with a channel-shaped molded portion 50 which is also shown in FIG. 4, being a cross-section at the corner 16. The side walls 25 and 26 and the lip 30 are cut away to accommodate the channel-shaped portion 50.

At the line C—C of FIG. 2, the molded moulded insert 47 no longer exists, and the separated parts of the side wall 24 are simply secured together—and this is continued to the end T of the channel 18.

In this way, the sealing and guiding channel 18 can be given a sharp radius to match the sharp corner 16 of the frame on the outside of the window and a smooth radius on the inside of the window.

Also, by providing a third wall 25, the portion 48 of the insert 47 may be hidden from view by the lip 29 of the wall 25. This is shown most clearly in FIG. 4 where it will be noted that the lip portion 29A is in contact with the side wall 24 approximately at the point where it is secured to the distal edge 49 (see FIG. 6) of the molded portion 48 of the insert 47. Thus the lip 29 of the wall 25 completely hides the molded portion 48 from view. This is advantageous because it means that the sheen and colour of the molded insert 47 need not match that of the sealing and guiding strip 18.

It will be noted that the effect of the smooth radius for the lip 24 over the region A (see FIG. 5) means that the lip 24 follows a shorter path than the lips 29 and 30, which more closely follow the sharp corner 16. The excess length of the lip 24 is removed by making a cut at 52, removing the excess length and rejoining the ends. The cut 52 could be made at any point along the arc A.

What is claimed is:

1. In combination, a frame defining a window opening positioned between a first environment and a second environment and having a corner of a predetermined angle, and a window glass sealing and guiding channel arrangement mounted on the frame for sealingly receiving and guiding a window glass for the window opening, the channel arrangement comprising a channel base and first and second integral channel side walls made of flexible material, each integral channel side wall having a distal edge portion including a lip extending along the integral channel side wall, the channel arrangement being mounted in the frame so that the first integral channel side wall is positioned in the first environment and the second integral channel side wall is positioned in the second environment, the distal edge portion including the lip of the first integral channel side wall being physically separated from a first part of the first integral channel side wall by a first cut which extends through the first integral channel side wall and along a region of the channel arrangement, the physically separated distal edge portion including the lip of the first integral channel side wall bridging across the corner, the distal edge portion including the lip of the second integral channel side wall being physically separated from a first part of the second integral channel side wall by a second cut which extends through the second integral channel side wall and along said region of the channel arrangement, the channel arrangement comprising a third integral channel side wall extending from the channel base of the channel arrangement and between the first and second integral channel side walls of the channel arrangement and adjacent the first integral channel side wall of the channel arrangement and also made of said flexible material, the third integral channel side wall having a distal edge portion including a lip extending along the third integral channel side wall and said distal edge portion including said lip of said third integral channel side wall being physically separated from a first part of the third integral channel side wall along said region of the channel arrangement and which bridges across the corner, the base of the channel arrangement and the first parts of the side walls of the channel arrangement along the region of the channel arrangement forming a channel portion which is completely removed from the channel arrangement, a predetermined insert being secured in position in the channel arrangement to replace the completely removed said channel portion, the insert comprising a base and first, second and third side walls which replace the base and the first, parts of the side walls of the completely removed said channel portion but are sized to extend to and to be respectively secured to the physically separated distal edge portions of the first, second and third integral channel side walls of the channel arrangement, the distal edge portion including the lip of the third integral channel side wall of the channel arrangement being sized and positioned along said region of the channel arrangement to substantially overlie the first side wall of said insert thereby to completely cover the insert from view through the window glass in all directions from the second environment to the first environment.

2. The combination according to claim 1, in which the lip of said first integral channel side wall where it is physically separated from said first part of the first integral channel side wall along the region of the channel arrangement is cut through across its length and a lengthwise-extending portion thereof is removed at the first cut to reduce the length of the lip of the first integral channel side wall and to produce two ends facing each other across the first cut, the two facing ends then being re-joined.

3. The combination according to claim 1, in which the insert is a molded insert.

4. The combination according to claim 1, in which the insert is secured to the channel arrangement using an adhesive material.

5. The combination according to claim 3, in which the insert is secured to the channel arrangement by molding the insert onto the channel base and said integral channel side walls of the channel arrangement.

6. The combination according to claim 1, in which the channel base, integral channel side walls and lips of the channel arrangement are produced by extrusion.

7. A combination according to claim 1, wherein the second and third integral channel side walls of the channel arrangement form a channel and the distal edge portions of the second and third integral channel side walls form a mouth for receiving said window glass, the respective lips of the second and third integral channel side walls partially extending across said mouth for contacting and sealing against opposite sides of the window glass when the window glass is received in said mouth.

8. The combination according to claim 1, wherein the second and third integral channel side walls of the channel arrangement form a channel with the channel base, the combination further including a lip within the channel of the channel arrangement and incliningly extended from the channel base thereof for engaging an edge of the window glass.

9. The combination according to claim 1, in which the window glass is a slidable window glass in a motor vehicle, the second environment being the environment external to the motor vehicle and the first environment being the environment inside the motor vehicle.

10. The combination according to claim 9, in which the frame is rigid and carried by a door of the motor vehicle.

* * * * *